United States Patent
Li et al.

(10) Patent No.: US 12,093,399 B1
(45) Date of Patent: Sep. 17, 2024

(54) VULNERABILITY DETECTION METHOD AND DEVICE FOR SMART CONTRACT, AND STORAGE MEDIUM

(71) Applicant: Hainan University, Haikou (CN)

(72) Inventors: Xiaoqi Li, Haikou (CN); Wenkai Li, Haikou (CN); Zekai Liu, Haikou (CN); Hailu Kuang, Haikou (CN)

(73) Assignee: HAINAN UNIVERSITY, Haikou (CN)

( * ) Notice: Subject to any disclaimer, the term of this patent is extended or adjusted under 35 U.S.C. 154(b) by 0 days.

(21) Appl. No.: 18/435,717

(22) Filed: Feb. 7, 2024

(30) Foreign Application Priority Data

May 23, 2023 (CN) .......................... 202310584937.7

(51) Int. Cl.
*G06F 21/57* (2013.01)
*G06F 21/64* (2013.01)
(Continued)

(52) U.S. Cl.
CPC ............ *G06F 21/577* (2013.01); *G06F 21/64* (2013.01); *G06N 3/045* (2023.01); *G06N 3/084* (2013.01); *G06F 2221/034* (2013.01)

(58) Field of Classification Search
CPC .. G06F 21/577; G06F 21/64; G06F 2221/034; G06N 3/045; G06N 3/084
See application file for complete search history.

(56) References Cited

U.S. PATENT DOCUMENTS 11,170,097 B1 * 11/2021 Kim .................. G06F 21/54
2019/0303541 A1 10/2019 Reddy et al.
(Continued)

FOREIGN PATENT DOCUMENTS

CN 111563742 A 8/2020
CN 113672515 A 11/2021
(Continued)

OTHER PUBLICATIONS

Bo et al., "Semantic-aware Graph Neural Network for Smart Contract Bytecode Vulnerability Detection," Engineering Science and Technology; vol. 54, Issue 02; Mar. 2022, pp. 49-55, China.
(Continued)

*Primary Examiner* — Baotran N To
(74) *Attorney, Agent, or Firm* — MUNCY GEISSLER OLDS & LOWE P.C.

(57) ABSTRACT

Disclosed are a vulnerability detection method and device for a smart contract, and a storage medium. The method includes the following steps: constructing a control flowchart for the smart contract and collecting opcodes, operands, and opcodes in a static single assignment (SSA) form based on a call flow thereof; crawling application binary interfaces in a blockchain browser based on an address of the smart contract; using the opcodes and the operands as an input, and outputting function parameters; monitoring whether there are specified actions in functions to determine function attributes; and fusing the opcodes in the SSA form and the application binary interfaces or a concatenation form of the function parameters and the function attributes by an encoder, and obtaining existent vulnerability types by a decoder. With the technical solution of the present disclosure, semantic and function interface information in bytecodes is effectively used, and multi-label vulnerability detection is implemented.

5 Claims, 3 Drawing Sheets

(51) Int. Cl.
*G06N 3/045*  (2023.01)
*G06N 3/084*  (2023.01)

(56) References Cited

U.S. PATENT DOCUMENTS

| | | | |
|---|---|---|---|
| 2019/0392138 A1* | 12/2019 | Rice | G06F 21/564 |
| 2021/0103582 A1* | 4/2021 | Wentworth | G06F 16/2365 |
| 2021/0110047 A1* | 4/2021 | Fang | H04L 63/1433 |
| 2021/0334363 A1* | 10/2021 | Kim | G06F 21/54 |
| 2022/0318399 A1* | 10/2022 | Rodler | G06F 21/51 |
| 2022/0358030 A1* | 11/2022 | Yanamala | H04L 9/3239 |
| 2023/0418951 A1* | 12/2023 | Park | G06F 40/151 |
| 2024/0020109 A1* | 1/2024 | Giesen | G06F 11/3604 |
| 2024/0095316 A1* | 3/2024 | Kim | G06F 8/433 |

FOREIGN PATENT DOCUMENTS

| | | |
|---|---|---|
| CN | 113886832 A | 1/2022 |
| CN | 114996126 A | 9/2022 |
| CN | 115017513 A | 9/2022 |
| CN | 115022026 A | 9/2022 |
| CN | 115033896 A | 9/2022 |
| CN | 115080981 A | 9/2022 |
| CN | 116089957 A | 5/2023 |

OTHER PUBLICATIONS

Li Ting, "Research on Online Vulnerability Detection Technology For Smart Contracts on Blockchain," China Excellent Master's Theses Full-text Database Information Technology Series, No. 04; Mar. 24, 2021, pp. 1138-1440, China.

* cited by examiner

VULNERABILITY DETECTION METHOD AND DEVICE FOR SMART CONTRACT, AND STORAGE MEDIUM

FIELD OF TECHNOLOGY

The present disclosure relates to the field of computer network security, in particular to a vulnerability detection method and device for a smart contract, and a storage medium.

BACKGROUND

In a blockchain system, smart contracts are functional code segments and define rules of interaction between nodes in a network. Smart contract-related vulnerabilities on an Ethereum blockchain are mainly concerned in the present disclosure. As an important level in the blockchain system, the security issue of the smart contracts is also an important factor for stable operation of the blockchain system.

Function interfaces for the smart contracts, namely, call interfaces are in two forms of function signatures and application binary interfaces. A function signature includes hash values of character strings of a function name and a function parameter prototype, and is used to determine a unique call entry for a function. When bytecode smart contracts are deployed on a chain, function methods in specific contracts can be specified by external nodes for application binary interfaces and contract addresses.

In an existing method for detecting vulnerabilities in a smart contract based on a deep learning technology, semantic features are obtained from opcodes of the smart contract and the vulnerabilities are detected through different models. The improvement of the vulnerability detection effect by designing different models relies too much on the semantic features at the data level. Therefore, in order to achieve the better vulnerability classification effect, such method relies on the diversity and comprehensiveness of data.

Compared with a conventional static analysis method, the deep learning-based vulnerability detection technology has the following defects:

In the deep learning-based vulnerability detection method for a smart contract, features in operands are not considered; in the conventional static analysis method, possible code execution processes are analyzed to determine whether there are logical vulnerabilities in codes; in the existing deep learning method, an opcode sequence in the codes is input to summarize features of the vulnerabilities; and while there are also some technologies for obtaining an opcode sequence more consistent with a call sequence by constructing a control flowchart or the like, original data existing in operands is still not considered.

There is multi-dimensional data in the Ethereum bytecode smart contracts, but only the opcode sequence is considered in the existing detection method; an Ethereum virtual machine as a stack-based virtual machine is an operating environment for the bytecode smart contracts; unlike a register-based virtual machine, there is function interface data in Java codes, but function interface information is not stored in the bytecode smart contracts; and function parameters can be extracted from called data based on specific rules, but the data has not been used in the existing vulnerability detection method for a smart contract.

SUMMARY

To solve the technical problems, the present disclosure provides a vulnerability detection method and device for a smart contract, and a storage medium. Semantic and function interface information in bytecodes is effectively used, and multi-label vulnerability detection is implemented.

To achieve the above objective, the present disclosure adopts the following technical solutions:

A vulnerability detection method for a smart contract is provided, including the following steps:

S1: constructing a control flowchart for the smart contract and collecting opcodes, operands, and opcodes in a static single assignment (SSA) form based on a call flow thereof;

S2: crawling application binary interfaces in a blockchain browser based on an address of the smart contract;

S3: using the opcodes and the operands as an input, and outputting function parameters;

S4: monitoring whether there are specified actions in functions to determine function attributes; and S5: fusing the opcodes in the SSA form and the application binary interfaces or a concatenation form of the function parameters and the function attributes by an encoder, and obtaining existent vulnerability types by a decoder.

As a preference, in step S1, the bytecode smart contract is translated to be in an opcode form, a program control flow call graph is constructed based on opcode execution rules, and hash values of all the functions and the opcodes of function bodies are collected during program control call; and bytecodes are converted into the opcodes in the SSA form.

As a preference, in step S2, the application binary interfaces are found in an Ethereum browser Etherscan through the address of the smart contract, and function names therein are removed and converted to be in a tensor form.

As a preference, in step S3, after the opcodes and the operands of the function bodies are collected, the function parameters are inferred from the opcodes and the operands by using a sequence-to-sequence model and are provided to the encoder.

As a preference, step S3 specifically includes:

step 31: performing one-hot encoding on all the opcodes and operands in the function bodies to serve as semantic information, using the semantic information as an input, and extracting semantic feature information through a bidirectional long short-term memory (LSTM) network;

step 32: searching for weight information capable of contributing the most to a current output in a current hidden layer state through an attention mechanism, and outputting a feature hidden layer state after all time steps; and step 33: constructing a bidirectional LSTM network with the same structure as that in step 31 to decode the feature hidden layer state, and obtaining the function parameters possibly occurring in an input function.

As a preference, step S5 includes:

step 51: extracting the opcodes corresponding to the bytecode smart contract, then removing stack operation instructions, and finally obtaining the opcodes in the SSA form as a semantic expression of the contract;

step 52: obtaining hidden-layer semantic features of the smart contract from the semantic expression of the smart contract through a bidirectional gate recurrent unit (GRU) model; determining whether the bytecode smart contract makes the application binary interfaces publicly available; if the application binary interfaces are not publicly available, directly jumping to step 53; otherwise, obtaining the publicly available application binary interfaces from the Ethereum browser Etherscan, and jumping to step 56;

step 53: obtaining the function parameters of the multiple functions in the bytecode smart contract by using a function parameter inference method, and summarizing the function attributes corresponding to each of the functions;

step 54: concatenating the function parameters and the function attributes of each of the functions in the smart contract to serve as function interface features of the single function;

step 55: combining the function interface features of all the functions in a position order of each of the functions in an opcode sequence to serve as function interface features of the smart contract, and jumping to step 57;

step 56: obtaining hidden-layer function interface features from the application binary interfaces and inferred function signature information, and if the function interface features in the feature hidden layer are obtained from the application binary interfaces, jumping to step 561, otherwise, jumping to step 562;

step 561: extracting the hidden-layer function interface features of the application binary interfaces from a two-dimensional perspective by using a convolutional neural network (CNN), and jumping to step 57;

step 562: for the interface features of each of the functions in the single smart contract, extracting local features of the single function in the single smart contract by using a one-dimensional CNN;

step 563: for the interface features of all the functions in the single smart contract, first compressing all function interface information by using a global average pooling layer, and then extracting global features of all the functions in the single smart contract by using the one-dimensional CNN;

step 564: adding the local features and the global features, then multiplying a result by the function interface features in the single smart contract after passing through an activation function to obtain the function interface features of the hidden layer, and jumping to step 57;

step 57: fusing the hidden-layer semantic features of the contract that are obtained in step 52 and the hidden-layer function interface features obtained in step 56 to serve as hidden-layer features of the smart contract; and step 58: decoding the hidden-layer features of the smart contract that are obtained in step 57 by using the bidirectional GRU model, and obtaining the existent vulnerability types.

A vulnerability detection device for a smart contract is further provided by the present disclosure, including:

a semantic extraction module configured to construct a control flowchart for the smart contract and collect opcodes, operands, and opcodes in an SSA form based on a call flow thereof;

an application binary interface obtaining module configured to crawl application binary interfaces in a blockchain browser based on an address of the smart contract;

a function parameter inference module configured to use the opcodes and the operands as an input and output function parameters;

a function attribute summarization module configured to monitor whether there are specified actions in functions to determine function attributes; and a vulnerability detection module configured to fuse the opcodes in the SSA form and the application binary interfaces or a concatenation form of the function parameters and the function attributes by an encoder and obtain existent vulnerability types by a decoder.

A storage medium is further provided by the present disclosure, where the storage medium stores a machine-executable instruction which, when called and executed by a processor, causes the processor to implement the vulnerability detection method for a smart contract.

Compared with the prior art, the present disclosure has the following beneficial effects:

According to the present disclosure, the more advantageous effects can be achieved under the condition of less training data; the semantic features and the function interface features are used for the first time to detect the vulnerabilities existing in the bytecode smart contract; additionally, in order to obtain more function interface data, it is proposed for the first time that the sequence-to-sequence model is used to infer the possible function parameters in the opcodes and the operands for the bytecode smart contract that does not make the application binary interfaces publicly available; furthermore, in order to obtain the more explicit semantic expression, the opcodes in the SSA form are used to extract the hidden-layer semantic features of the smart contract; in order to optimize the inferred function signature features, the opcode rules are used to infer the function attributes; in the same smart contract, the local features and the global features of a function interface expression are obtained and combined to obtain the optimized hidden-layer function interface features; and finally, the hidden-layer semantic features and the hidden-layer function interface features are combined to serve as the hidden-layer features of the contract, and the hidden-layer features of the contract are decoded to implement vulnerability classification. According to the present disclosure, semantic data and function signature data are obtained, and the semantic features and the function interface features are optimized by converting the SSA form and fusing the local features and the global features respectively, such that the vulnerability detection effect is improved to a certain extent.

BRIEF DESCRIPTION OF THE DRAWINGS

To more clearly illustrate the technical solutions of the present disclosure, the accompanying drawings that need to be used in the embodiments will be briefly described below. Apparently, the accompanying drawings in the description below merely illustrate some embodiments of the present disclosure. Those of ordinary skill in the art may also derive other accompanying drawings from these accompanying drawings without creative efforts.

DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the scope of protection of the present disclosure.

To make the above objective, features and advantages of the present disclosure more obvious and understandable, the present disclosure is further described in detail below with reference to the accompanying drawings and specific implementations.

Embodiment 1

Figure 1:
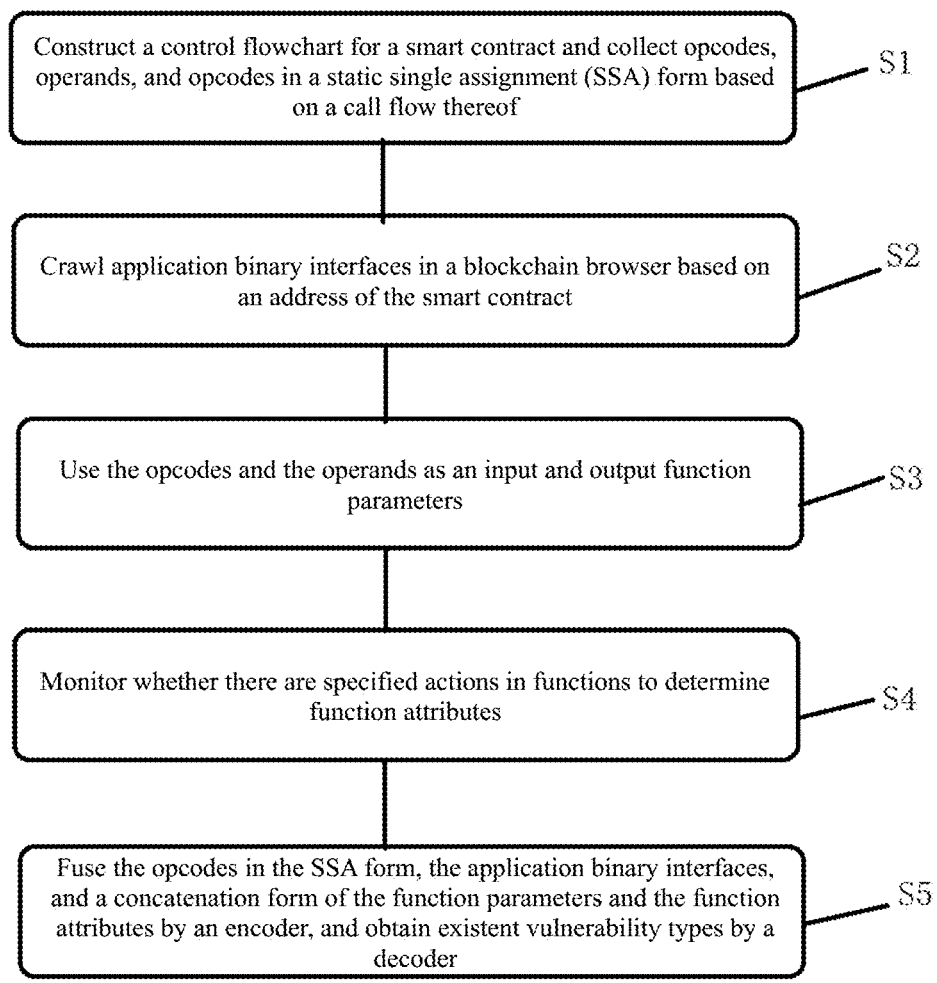
FIG. 1 is a flowchart of a vulnerability detection method for a smart contract in an embodiment of the present disclosure.

As shown in FIG. 1, a vulnerability detection method for a smart contract is provided in this embodiment of the present disclosure, including the following steps:
- S1: constructing a control flowchart for the smart contract and collecting opcodes, operands, and opcodes in an SSA form based on a call flow thereof;
- S2: crawling application binary interfaces in a blockchain browser based on an address of the smart contract;
- S3: using the opcodes and the operands as an input, and outputting function parameters;
- S4: monitoring whether there are specified actions in functions to determine function attributes; and
- S5: fusing the opcodes in the SSA form and the application binary interfaces or a concatenation form of the function parameters and the function attributes by an encoder, and obtaining existent vulnerability types by a decoder.

As an implementation of this embodiment of the present disclosure, in step S1, the bytecode smart contract is translated to be in an opcode form, a program control flow call graph is constructed based on opcode execution rules, and hash values of all the functions and the opcodes of function bodies are collected during program control call; and bytecodes are converted into the opcodes in the SSA form. The opcode of each function body is obtained by locating a function entry and a function end instruction. When the operation of jumping to another function is performed, two elements at a top of a stack are used as a function offset position and a function hash respectively; and the location and opcode of the function body are obtained based on the function offset position, and the function parameters are obtained from a public function signature library based on the function hash.

As an implementation of this embodiment of the present disclosure, in step S2, the application binary interfaces are found in an Ethereum browser Etherscan through the address of the smart contract, and function names therein are removed and converted to be in a tensor form.

As an implementation of this embodiment of the present disclosure, in step S3, after the opcodes and the operands of the function bodies are collected, the function parameters are inferred from the opcodes and the operands by using a sequence-to-sequence model and are provided to the encoder. A specific process includes:
- step 31: performing one-hot encoding on all the opcodes and operands in the function bodies to serve as semantic information, using the semantic information as an input, and extracting semantic feature information through a bidirectional LSTM network;
- step 32: searching for weight information capable of contributing the most to a current output in a current hidden layer state through an attention mechanism, and outputting a feature hidden layer state after all time steps; and
- step 33: constructing a bidirectional LSTM network with the same structure as that in step 31 to decode the feature hidden layer state, and obtaining the function parameters possibly occurring in an input function.

As an implementation of this embodiment of the present disclosure, in step S5, combining opcode data and function interface data to detect vulnerabilities of the smart contract includes:
- step 51: extracting the opcodes corresponding to the bytecode smart contract, then removing stack operation instructions, and finally obtaining the opcodes in the SSA form as a semantic expression of the contract;
- step 52: obtaining hidden-layer semantic features of the smart contract from the semantic expression of the smart contract through a bidirectional GRU model; determining whether the bytecode smart contract makes the application binary interfaces publicly available; if the application binary interfaces are not publicly available, directly jumping to step 53; otherwise, obtaining the publicly available application binary interfaces from the Ethereum browser Etherscan, and jumping to step 56;
- step 53: obtaining the function parameters of the multiple functions in the bytecode smart contract by using a function parameter inference method, and summarizing the function attributes corresponding to each of the functions;
- step 54: concatenating the function parameters and the function attributes of each of the functions in the smart contract to serve as function interface features of the single function;
- step 55: combining the function interface features of all the functions in a position order of each of the functions in an opcode sequence to serve as function interface features of the smart contract, and jumping to step 57;
- step 56: obtaining hidden-layer function interface features from the application binary interfaces and inferred function signature information, and if the function interface features in the feature hidden layer are obtained from the application binary interfaces, jumping to step 561, otherwise, jumping to step 562;
- step 561: extracting the hidden-layer function interface features of the application binary interfaces from a two-dimensional perspective by using a CNN, and jumping to step 57;
- step 562: for the interface features of each of the functions in the single smart contract, extracting local features of the single function in the single smart contract by using a one-dimensional CNN;
- step 563: for the interface features of all the functions in the single smart contract, first compressing all function interface information by using a global average pooling layer, and then extracting global features of all the functions in the single smart contract by using the one-dimensional CNN;
- step 564: adding the local features and the global features, then multiplying a result by the function interface features in the single smart contract after passing through an activation function to obtain the function interface features of the hidden layer, and jumping to step 57;
- step 57: fusing the hidden-layer semantic features of the contract that are obtained in step 52 and the hidden-layer function interface features obtained in step 56 to serve as hidden-layer features of the smart contract; and step 58: decoding the hidden-layer features of the smart contract that are obtained in step 57 by using the bidirectional GRU model, and obtaining the existent vulnerability types.

In summary, in this embodiment of the present disclosure, the semantic and function interface features are fused to serve as the features of the contract, the opcodes are obtained from the bytecodes and converted into the opcodes in the SSA format, the function parameters and the function attributes are inferred from the bytecode smart contract, the opcodes in the SSA format and the function parameters and attributes are converted into embedded vectors as their feature representations, then the two types of feature representations are fused to serve as the features of the contract, and finally the vulnerability types are obtained by decoding a feature representation of the contract.

Embodiment 2

Figure 2:
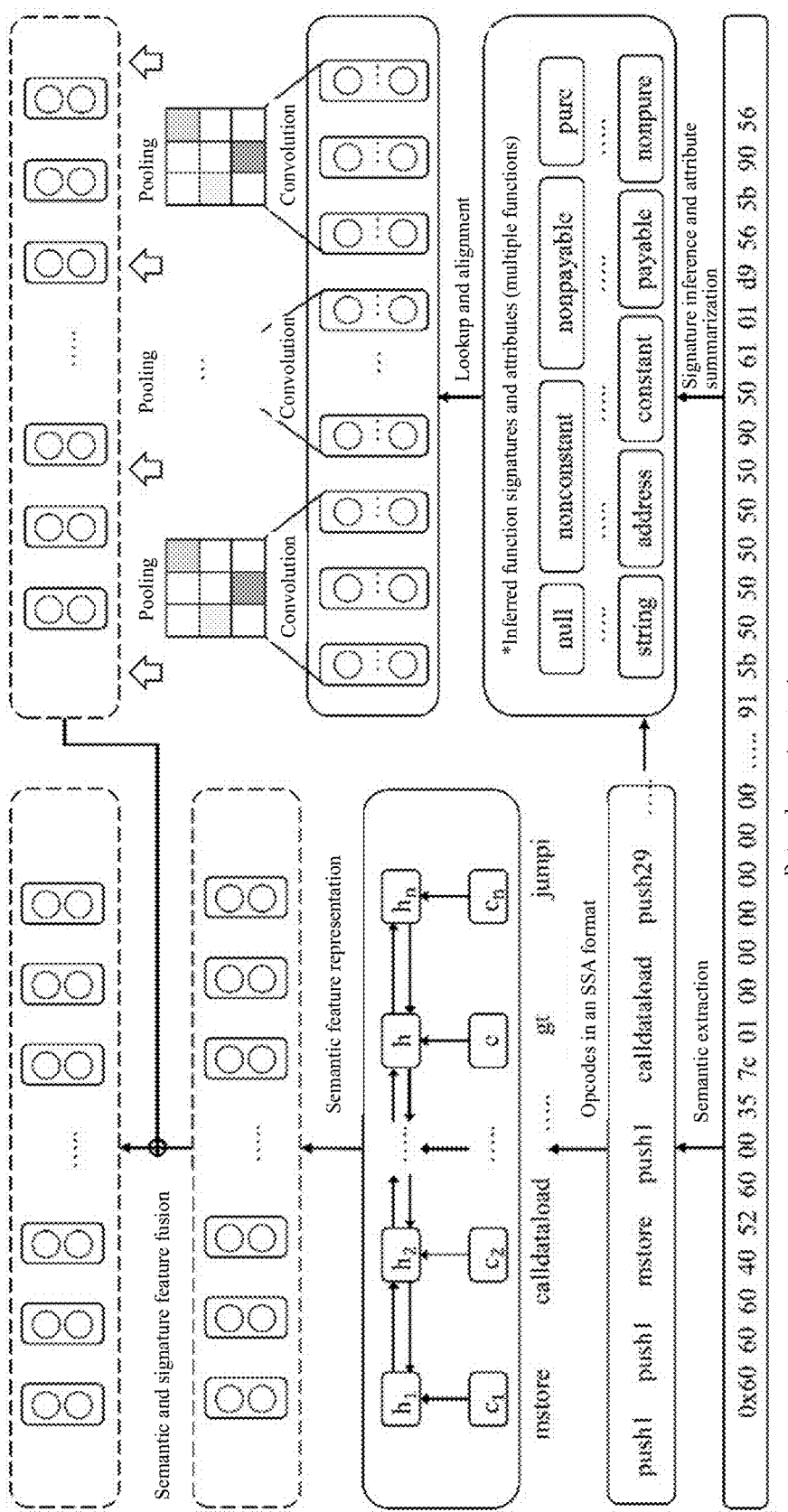
FIG. 2 is another flowchart of a vulnerability detection method for a smart contract in an embodiment of the present disclosure.

A vulnerability detection method for a smart contract is provided in this embodiment of the present disclosure, including the following steps: semantic extraction, application binary interface obtaining, function signature inference, function attribute summarization, and vulnerability detection. As shown in FIG. 2, in this embodiment of the present disclosure, semantic extraction and function interface inference are performed, corresponding feature representations are obtained, dimensions of the two types of feature representations are aligned, and then two types of features are fused to obtain a final feature representation.

The semantic extraction process includes the steps below.
1) The bytecode smart contract is preprocessed, where the bytecode smart contract is converted into an opcode sequence, and the bytecodes are converted into an opcode sequence in an SSA form.
2) Opcode sequences of function bodies and function hashes in the bytecode smart contract are collected, where for constructing a control flow call graph, hash values of all the functions and the opcode sequences of the function bodies are collected. Pseudocodes for a collection method are as follows:

1 Initialization
2 bc {A bytecode smart contract}
3 OpSeq {global map of function context}
4 Ids {global map of function hashes}
5 BasicBlocks, eb←CFG.countBasicBlocks(EVMAsm (bc))
6 push Value {value of stack element}
7 prePush Value {previous value of stack element}
8 Function getFuncInfo(block, entry):
9 for each i in block.ins do Ops←i;
10 if entry then
11 if end of block.ins==jumpi then
12 Assert length of block.ins>2
13 dest←block.ins.oprand[−2]
14 OpSeq[dest]←getFuncInfo(BasicBlocks[dest], false)
15 Ids[dest]←None
16 endif
17 return Ops
18 endif
19 for i in block.ins:
20 if i==pushes then
21 prePush Value, push Value←push Value, oprand of i
22 endif
23 endfor
24 if end of block.ins==jumpi then
25 if prePush Value then
26 fnAddr, fnId←push Value, prePush Value
27 endif
28 else
29 fnAddr, fnId←None
30 endif
31 if fnAddr in BasicBlocks then
32 Opseq[fnAddr]←getFuncInfo(BasicBlocks[fnAddr], false)
33 Ids[fnAddr]←fnId
34 if end of block.ins==jumpi then
35 dest←end of block+1
36 OpSeq[dest]←getFuncInfo(BasicBlocks[dest], false)
37 endif
38 endif
39 return Ops
40 end Function
41 foreach ebAddr in eb do
42 OpSeq[ebAddr]←getFuncInfo(BasicBlocks[ebAddr], True)
43 endforeach In the pseudocodes described above, operational logic is as follows:

Before operation, required variables and pre-environment variables, such as global variables in third and fourth rows of the pseudocodes and contract basic blocks in a fifth row, are initialized.

All the basic blocks and entry addresses eb thereof are obtained.

A function for collecting the opcode sequences of the function bodies and the function hashes is defined in eighth to forty-first rows of the pseudocodes and is called starting from all basic block entries in a forty-third row.

In the function, if there is a basic block entry, an opcode sequence therein is collected, and if there is a function jump, an opcode sequence in a jumping function body is recorded in OpSeq.

The last two digits of a stack pushing operation are recorded in a twentieth row of the pseudocodes. When a function is called in a twenty-fourth row of the pseudocodes, an element at the top of the stack is used as an initial basic block address for a function which is to jump, and an element after removal of the element at the top of the stack is a function hash corresponding to the jumping function.

When there is no jump in a basic block, it moves to an instruction of a next address and a function is called in a thirty-fifth row of the pseudocodes.

According to the function of the above pseudocodes, the opcode sequences in the function bodies and the corresponding function hashes are recorded in OpSeq and Ids respectively.

The application binary interface obtaining process includes the steps below.

Corresponding application binary interfaces are crawled from an Ethereum browser Etherscan based on an address of the bytecode smart contract.

Operation is performed on each application binary interface, where the operation includes conversion to be in a Dataframe format, removal of function name attributes, and conversion to be in a tensor format for model training and testing.

The function signature inference process includes the steps below.

In the semantic extraction process, an opcode address of a function body entry and an opcode sequence of a first basic block have been collected in OpSeq. The opcode address of the function body entry and the function hash of the function have been collected in Ids.

An accurate control flowchart is obtained by using a control flowchart constructor in EtherSolve. All opcodes and operands in multiple basic blocks are obtained by using a depth-first search algorithm.

In a public function signature library, function signature data corresponding to the function hashes in Ids are searched for and function parameters therein are extracted.

The process of training a sequence-to-sequence model and using opcodes and operands of function body entries that correspond to function hashes as an input and function parameters as an output includes the following steps:
  extracting hidden-layer semantic features from the opcodes and the operands by using a bidirectional LSTM model;
  finding hidden-layer features that contribute more to the output in the hidden-layer semantic features by using an attention mechanism;
  decoding the hidden-layer features by using the bidirectional LSTM model again to obtain the function parameters; and
  for a loss function, using a Focal loss function for weighting each function signature type.

The function attribute summarization process includes the following steps:
  summarizing opcode corresponding relationships based on Solidity function rules, and summarizing View attributes of the functions, where
  1) in Rule 1, a Storage state variable is modified;
  Rule 1 corresponds to an opcode: STORE;
  2) in Rule 2, an event is initiated;
  Rule 2 corresponds to opcodes: LOG 0, LOG 1, LOG 2, LOG 3, and LOG 4;
  3) in Rule 3, other contracts are created;
  Rule 3 corresponds to opcodes: CREATE and CREATE2;
  4) in Rule 4, contract self-destruction is performed;
  Rule 4 corresponds to an opcode: SELFDESTRUCT;
  5) in Rule 5, low-level call is performed;
  Rule 5 corresponds to opcodes: CALL, CALLCODE, and DELEGATECALL;
  the opcode corresponding relationships are summarized based on the Solidity function rules, and Payable attributes of the functions are summarized;
  6) in rule 6, transaction in assets is performed;
  Rule 6 corresponds to an opcode: CALLVALUE;
  the opcode corresponding relationships are summarized based on the Solidity function rules, and Pure attributes of the functions are summarized;
  7) in Rule 7, Gas consumption is performed; and
  Rule 7 corresponds to opcodes: STOP, RETURN, and REVERSE.

There are two cases for vulnerability detection, including the steps below.

First, the hidden features in the opcodes in the SSA format obtained during the semantic extraction are obtained by using a bidirectional LSTM layer to serve as semantic feature representations.

In a first case, when the application binary interfaces exist,
  function names in the application binary interfaces are removed and converted to be in a tensor format; then all the application binary interfaces in the tensor format are aligned through zero alignment; the hidden-layer features therein are obtained through a CNN; the hidden-layer features obtained by the CNN are aligned with dimensions of the semantic feature representations by using an average pooling layer to serve as functional interface feature representations; and the function interface feature representations and the semantic feature representations are concatenated to serve as a hidden-layer feature representation of the contract.

In a second case, when the application binary interfaces do not exist,
  possible function parameters in all function bodies of the contract are inferred using the function signature inference process; function attributes in all the function bodies are summarized; the function parameters and the corresponding function attributes of all the function bodies are concatenated into function data in multiple rows and multiple columns, where the rows of the function data are sorted in an opcode address order; and converting all the data to be in a tensor format by using a lookup table, and aligning the existing data through zero padding to obtain inferred function feature representations.

Figure 3:
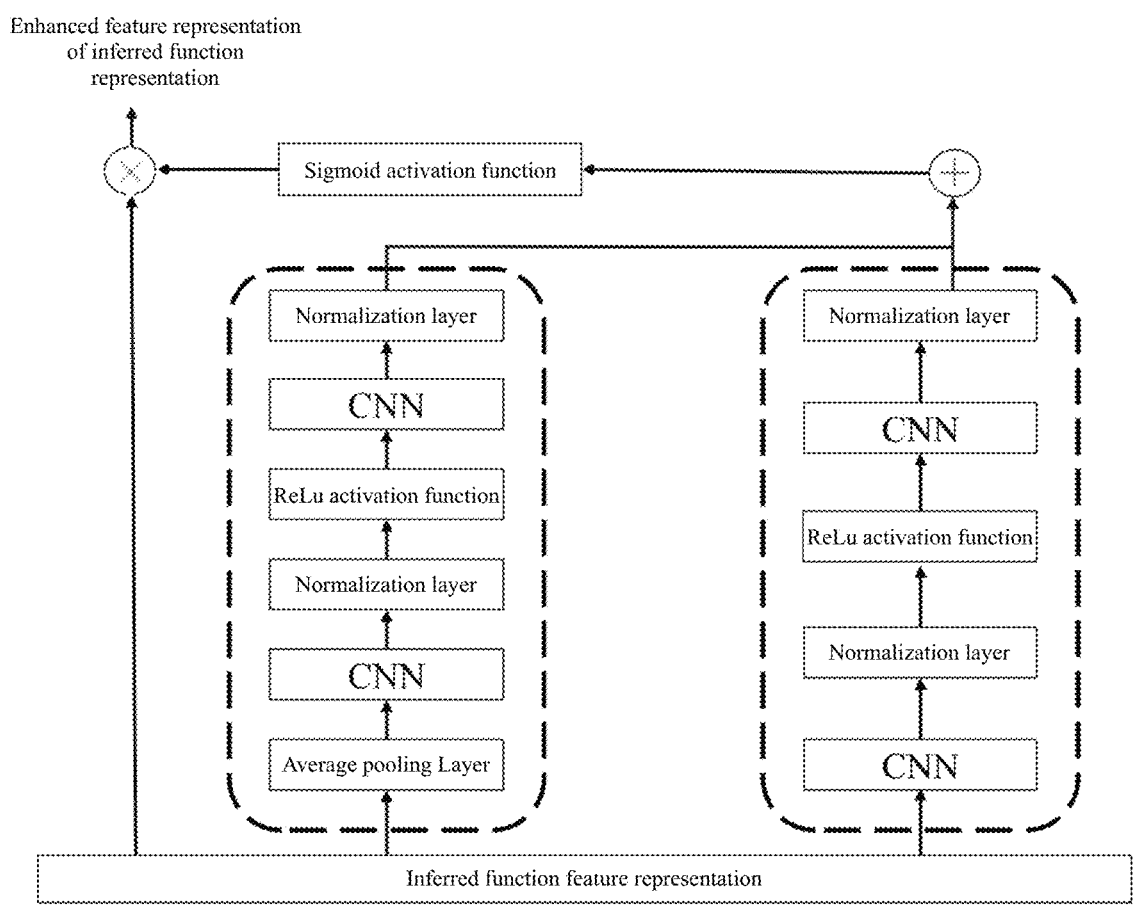
FIG. 3 is a schematic diagram of obtaining an enhanced feature representation of a function signature.

As shown in FIG. 3, the hidden-layer features of each row of data in the function feature representations are obtained by using a one-dimensional CNN that converts multiple channels to few channels, and then the hidden-layer features of each row of data in the function feature representations are obtained through a normalization layer, an ReLu activation layer, a one-dimensional CNN that restores few channels to multiple channels, and a normalization layer, so as to serve as local features of the inferred function representations.

Multiple rows of the inferred function feature representations are converted into a single row of data by using the average pooling layer, and this row of data passes through the one-dimensional CNN that converts multiple channels into few channels, the normalization layer, the ReLu activation layer, the one-dimensional CNN that restores few channels to multiple channels, and the normalization layer to obtain the hidden-layer features of the overall data, so as to serve as global features of the inferred function representations.

The local and global features of the inferred function representations are added, and a Sigmoid activation function is passed to obtain feature weights of the inferred function representations. The inferred function representations are multiplied by the feature weights thereof to obtain enhanced feature representations of the inferred function representations. The enhanced feature representations of the inferred function representations are aligned with the dimensions of the semantic feature representations through the average pooling layer to serve as inferred function interface feature representations. The inferred function interface feature representations and the semantic feature representations are concatenated to serve as an inferred hidden-layer feature representation of the contract. The hidden-layer features of the contract or the inferred hidden-layer feature representations of the contract are decoded by using the bidirectional LSTM layer to obtain existent vulnerabilities types therein.

Embodiment 3

A vulnerability detection method for a smart contract is provided, including:
  collecting function parameters and corresponding function semantic data by constructing a control flowchart;
  training a sequence-to-sequence model using the collected function parameters and function semantic data that are publicly available;

predicting the function parameters not publicly available by using the trained sequence-to-sequence model;

concatenating the function parameters not publicly available and function attributes obtained by summarizing opcodes to serve as inferred single function interface data;

collecting publicly available application binary interfaces of the smart contract to serve as native function interface data;

connecting all inferred single function interface data in the single smart contract to serve as inferred function interface data;

extracting semantic data feature representations and function interface data feature representations, and fusing the semantic data feature representations and the function interface data feature representations into a feature representation of the smart contract by an encoder; and decoding the feature representation of the smart contract to classify vulnerabilities.

As an implementation of this embodiment of the present disclosure, the process of collecting function parameters and corresponding function semantic data specifically includes: converting the bytecode smart contract into opcodes and opcodes in an SSA form, constructing the control flowchart using the opcodes, and using the opcodes in the SSA form as semantic feature representations of the smart contract.

In the process of constructing the control flowchart, it is determined whether it jumps to another function based on whether the last opcode in a basic block is a conditional jump instruction;

a basic block with a conditional jump instruction being an end instruction is obtained, a corresponding stack structure is inferred, and two elements at a bottom of a stack are collected to serve as a basic block address and a function hash value respectively;

an initial position of a corresponding opcode of a function is located using the basic block address, and a corresponding function opcode collection action is executed based on whether the end instruction of the basic block is the conditional jump instruction; and a function signature inference model is trained using the collected data, where the opcodes are used as an input and the function parameters of function signatures in a public function signature library that correspond to function hashes are used as an output.

Further, the process of converting the bytecode smart contract into opcodes and opcodes in an SSA form specifically includes: removing stack data operation instructions and uniformly converting them into intermediate language expressions to obtain opcode sequences in the SSA form.

As an implementation of this embodiment of the present disclosure, the process of training a sequence-to-sequence model using the collected function parameters and function semantic data that are publicly available specifically includes:

receiving the bytecode smart contract in an opcode form by the sequence-to-sequence model, dividing functions in the bytecode smart contract according to the opcode form, and finding unique corresponding function hashes of all the functions;

searching for function signatures corresponding to the function hashes in the public function signature library, constructing a data set, and using opcode and operand sequences of function entry basic blocks as input data and function parameters in the function signatures as predicted results;

performing one-hot encoding on the opcode and operand sequences, searching for feature representations of the sequences in an LSTM network, then searching for contribution weights of predicting the function parameters in the feature representations through an attention mechanism, and forming feature representations of the functions; and decoding the feature representations of the functions through LSTM to obtain corresponding function parameters of the functions.

A model loss function is a Focal Loss function, a ratio of the number of types to the total number is a difficulty parameter for model fitting, and a loss in a backpropagation process is an average value of all type losses.

As an implementation of this embodiment of the present disclosure, the process of fusing the semantic data feature representations and the function interface data feature representations by an encoder specifically includes:

receiving the bytecode smart contract in the form of opcodes in the SSA form and function interfaces of the smart contract, and if the application binary interfaces of the smart contract are publicly available, using the application binary interfaces as the function interfaces, otherwise, obtaining the parameters of all the functions in the smart contract through the sequence-to-sequence model;

obtaining the opcodes in the functions and summarizing whether there are specified opcodes to infer the function attributes, then concatenating the function parameters and function attributes of all the functions to serve as inferred function interfaces, and combining the function interfaces of the multiple functions in the single smart contract to be in a multi-row form;

aligning all the function parameters and function attributes to make them maintain the same dimension, and performing padding to make the application binary interfaces and the inferred function interfaces maintain the same dimension;

converting the bytecode smart contract into the opcodes in the SSA form, performing one-hot encoding on the opcodes in the SSA form and the function interfaces, obtaining the semantic feature representations of the opcodes in the SSA form through a GRU network, obtaining the feature representations of the function interfaces through a modified multi-scale channel attention module, and connecting the semantic feature representations and the feature representations of the function interfaces to serve as semantic and function hidden-layer feature representations; and decoding semantic and enhanced function hidden-layer feature representations through GRU to obtain existent vulnerabilities in the smart contract.

Further, the process of summarizing whether there are specified opcodes to infer function attributes is specifically as follows:

The function attributes include state variability and payability. When actions of storage modification, event sending, subcontract creation, self-destruction, and low-level call are monitored, if the above actions exist, the function modifies a state variable; and the storage modification action corresponds to an opcode SSTORE, the event sending action corresponds to an opcode LOG, the subcontract creation action corresponds to an opcode CREATE, the self-destruction action corresponds to an opcode SELFSTRUCT, and the low-level call corresponds to opcodes CALL, CALLCODE, and DELEGATECALL.

When an action of GAS consumption is monitored, if the above action exists, the function checks the state variable. For the convenience of monitoring, opcodes are converted into opcodes in an SSA form, irrelevant opcodes of stack operation and the like are removed, and opcodes STOP, RETURN, and REVERSE are monitored. If only the above opcodes exist, it indicates that the function has no GAS consumption.

When an action of transaction in assets is monitored, if the above action exists, the function has the payability. The action of transaction in assets corresponds to an opcode CALLVALUE.

Further, the modified multi-scale channel attention module is specifically as follows: a convolutional layer, a normalization layer, an activation layer, a convolutional layer, and a normalization layer form a network sequence, and inferred function interface information of each function in a single smart contract is input to the network sequence to obtain local features of the function; the first convolutional layer of the network sequence maps high-dimensional channels to low-dimensional channels, and the second convolutional layer restores the low-dimensional channels to the high-dimensional channels; and all function interfaces in the single smart contract pass through one average pooling layer and then pass through the network sequence to obtain global features of the function, the local features and the global features of the function are added, then overall features of the function are obtained through one activation function, and finally all the function interfaces of the single smart contract are multiplied by the overall features of the function to obtain hidden-layer features of the function.

Embodiment 4

A vulnerability detection device for a smart contract is further provided in this embodiment of the present disclosure, including:
- a semantic extraction module configured to construct a control flowchart for the smart contract and collect opcodes, operands, and opcodes in an SSA form based on a call flow thereof;
- an application binary interface obtaining module configured to crawl application binary interfaces in a blockchain browser based on an address of the smart contract;
- a function parameter inference module configured to use the opcodes and the operands as an input and output function parameters;
- a function attribute summarization module configured to monitor whether there are specified actions in functions to determine function attributes; and
- a vulnerability detection module configured to fuse the opcodes in the SSA form and the application binary interfaces or a concatenation form of the function parameters and the function attributes by an encoder and obtain existent vulnerability types by a decoder.

Embodiment 5

A storage medium is further provided in this embodiment of the present disclosure, where the storage medium stores a machine-executable instruction which, when called and executed by a processor, causes the processor to implement the vulnerability detection method for a smart contract.

The above embodiments merely describe the preferred implementations of the present disclosure, and do not limit the scope of the present disclosure. Without departing from the design spirit of the present disclosure, various variations and improvements made by those of ordinary skill in the art to the technical solutions of the present disclosure should all fall within the scope of protection determined by the claims of the present disclosure.

What is claimed is:

1. A vulnerability detection method for a smart contract, comprising:
   S1: constructing a control flowchart for the smart contract and collecting opcodes, operands, and opcodes in a static single assignment (SSA) form based on a call flow thereof;
   S2: crawling application binary interfaces in a blockchain browser based on an address of the smart contract;
   S3: using the opcodes and the operands as an input, and outputting function parameters;
   S4: monitoring whether there are specified actions in functions to determine function attributes; and
   S5: fusing the opcodes in the SSA form and the application binary interfaces or a concatenation form of the function parameters and the function attributes by an encoder, and obtaining existent vulnerability types by a decoder;
   wherein in step S3, after the opcodes and the operands of function bodies are collected, the function parameters are inferred from the opcodes and the operands by using a sequence-to-sequence model and are provided to the encoder;
   step S3 comprises:
      step 31: performing one-hot encoding on all the opcodes and operands in the function bodies to serve as semantic information, using the semantic information as an input, and extracting semantic feature information through a first bidirectional long short-term memory (LSTM) network having a structure;
      step 32: searching for weight information capable of contributing a most to a current output in a current hidden layer state through an attention mechanism, and outputting a feature hidden layer state after all time steps; and
      step 33: constructing a second bidirectional LSTM network with the same structure as the first bidirectional LSTM network in step 31 to decode the feature hidden layer state, and obtaining the function parameters possibly occurring in an input function; and
   step S5 comprises:
      step 51: extracting the opcodes corresponding to the smart contract, then removing stack operation instructions, and finally obtaining the opcodes in the SSA form as a semantic expression of the smart contract;
      step 52: obtaining hidden-layer semantic features of the smart contract from the semantic expression of the smart contract through a bidirectional gate recurrent unit (GRU) model; determining whether the smart contract makes the application binary interfaces publicly available; if the application binary interfaces are not publicly available, directly jumping to step 53; otherwise, obtaining the publicly available application binary interfaces from an Ethereum browser Etherscan, and jumping to step 56;
      step 53: obtaining the function parameters of the functions in the smart contract by using a function parameter inference method, and summarizing the function attributes corresponding to each of the functions;

step 54: concatenating the function parameters and the function attributes of each of the functions in the smart contract to serve as function interface features of each of the functions;

step 55: combining the function interface features of all the functions in a position order of each of the functions in an opcode sequence to serve as function interface features of the smart contract, and jumping to step 57;

step 56: obtaining hidden-layer function interface features from the application binary interfaces and inferred function signature information, and if the function interface features in the feature hidden layer are obtained from the application binary interfaces, jumping to step 561, otherwise, jumping to step 562;

step 561: extracting the hidden-layer function interface features of the application binary interfaces from a two-dimensional perspective by using a convolutional neural network (CNN), and jumping to step 57;

step 562: for the interface features of each of the functions in a single smart contract, extracting local features of the single function in the single smart contract by using a one-dimensional CNN;

step 563: for the interface features of all the functions in the single smart contract, first compressing all function interface information by using a global average pooling layer, and then extracting global features of all the functions in the single smart contract by using the one-dimensional CNN;

step 564: adding the local features and the global features, then multiplying a result by the function interface features in the single smart contract after passing through an activation function to obtain the function interface features of the hidden layer, and jumping to step 57;

step 57: fusing the hidden-layer semantic features of the smart contract that are obtained in step 52 and the hidden-layer function interface features obtained in step 56 to serve as hidden-layer features of the smart contract; and step 58: decoding the hidden-layer features of the smart contract that are obtained in step 57 by using the bidirectional GRU model, and obtaining the existent vulnerability types.

2. The vulnerability detection method for the smart contract according to claim 1, wherein in step S1, the smart contract is translated to be in an opcode form, a program control flow call graph is constructed based on opcode execution rules, and hash values of all the functions and the opcodes of the function bodies are collected during program control call; and bytecodes are converted into the opcodes in the SSA form.

3. The vulnerability detection method for the smart contract according to claim 2, wherein in step S2, the application binary interfaces are found in the Ethereum browser Etherscan through the address of the smart contract, and function names therein are removed and converted to be in a tensor form.

4. A vulnerability detection device for the smart contract that implements the vulnerability detection method for the smart contract according to claim 1, the vulnerability detection device comprising:
a processor configured to function as:
a semantic extraction module configured to construct the control flowchart for the smart contract and collect opcodes, operands, and opcodes in an SSA form based on the call flow thereof in step S1;
an application binary interface obtaining module configured to crawl the application binary interfaces in the blockchain browser based on the address of the smart contract in step S2;
a function parameter inference module configured to use the opcodes and the operands as the input and output the function parameters in step S3;
a function attribute summarization module configured to monitor whether there are specified actions in the functions to determine the function attributes in step S4; and
a vulnerability detection module configured to fuse the opcodes in the SSA form and the application binary interfaces or the concatenation form of the function parameters and the function attributes by the encoder and obtain the existent vulnerability types by the decoder in step S5.

5. A non-transitory computer-readable storage medium, wherein the non-transitory computer-readable storage medium stores a machine-executable instruction which, when called and executed by a processor, causes the processor to implement a vulnerability detection method comprising:
S1: constructing a control flowchart for the smart contract and collecting opcodes, operands, and opcodes in a static single assignment (SSA) form based on a call flow thereof;
S2: crawling application binary interfaces in a blockchain browser based on an address of the smart contract;
S3: using the opcodes and the operands as an input, and outputting function parameters;
S4: monitoring whether there are specified actions in functions to determine function attributes; and
S5: fusing the opcodes in the SSA form and the application binary interfaces or a concatenation form of the function parameters and the function attributes by an encoder, and obtaining existent vulnerability types by a decoder;
wherein in step S3, after the opcodes and the operands of function bodies are collected, the function parameters are inferred from the opcodes and the operands by using a sequence-to-sequence model and are provided to the encoder;
step S3 comprises:
step 31: performing one-hot encoding on all the opcodes and operands in the function bodies to serve as semantic information, using the semantic information as an input, and extracting semantic feature information through a first bidirectional long short-term memory (LSTM) network having a structure;
step 32: searching for weight information capable of contributing a most to a current output in a current hidden layer state through an attention mechanism, and outputting a feature hidden layer state after all time steps; and
step 33: constructing a second bidirectional LSTM network with the same structure as the first bidirectional LSTM network in step 31 to decode the feature hidden layer state, and obtaining the function parameters possibly occurring in an input function; and
step S5 comprises:
step 51: extracting the opcodes corresponding to the smart contract, then removing stack operation instructions, and finally obtaining the opcodes in the SSA form as a semantic expression of the smart contract;

step 52: obtaining hidden-layer semantic features of the smart contract from the semantic expression of the smart contract through a bidirectional gate recurrent unit (GRU) model; determining whether the smart contract makes the application binary interfaces publicly available; if the application binary interfaces are not publicly available, directly jumping to step 53; otherwise, obtaining the publicly available application binary interfaces from an Ethereum browser Etherscan, and jumping to step 56;

step 53: obtaining the function parameters of the functions in the smart contract by using a function parameter inference method, and summarizing the function attributes corresponding to each of the functions;

step 54: concatenating the function parameters and the function attributes of each of the functions in the smart contract to serve as function interface features of each of the functions;

step 55: combining the function interface features of all the functions in a position order of each of the functions in an opcode sequence to serve as function interface features of the smart contract, and jumping to step 57;

step 56: obtaining hidden-layer function interface features from the application binary interfaces and inferred function signature information, and if the function interface features in the feature hidden layer are obtained from the application binary interfaces, jumping to step 561, otherwise, jumping to step 562;

step 561: extracting the hidden-layer function interface features of the application binary interfaces from a two-dimensional perspective by using a convolutional neural network (CNN), and jumping to step 57;

step 562: for the interface features of each of the functions in a single smart contract, extracting local features of the single function in the single smart contract by using a one-dimensional CNN;

step 563: for the interface features of all the functions in the single smart contract, first compressing all function interface information by using a global average pooling layer, and then extracting global features of all the functions in the single smart contract by using the one-dimensional CNN;

step 564: adding the local features and the global features, then multiplying a result by the function interface features in the single smart contract after passing through an activation function to obtain the function interface features of the hidden layer, and jumping to step 57;

step 57: fusing the hidden-layer semantic features of the smart contract that are obtained in step 52 and the hidden-layer function interface features obtained in step 56 to serve as hidden-layer features of the smart contract; and step 58: decoding the hidden-layer features of the smart contract that are obtained in step 57 by using the bidirectional GRU model, and obtaining the existent vulnerability types.

* * * * *